J. M. KEEP.
Animal-Trap.
No. 221,320.  Patented Nov. 4, 1879.
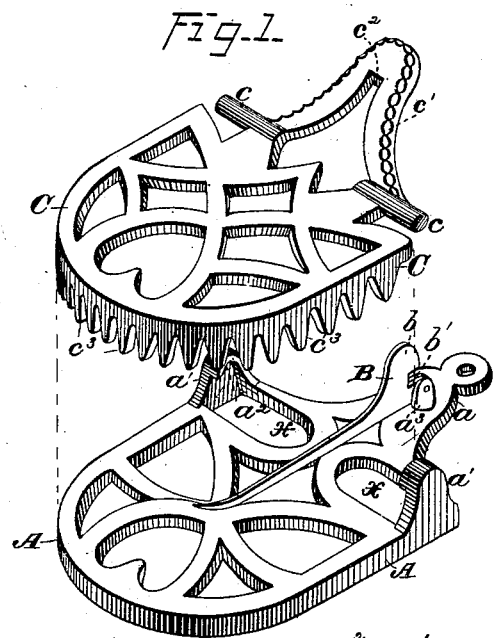
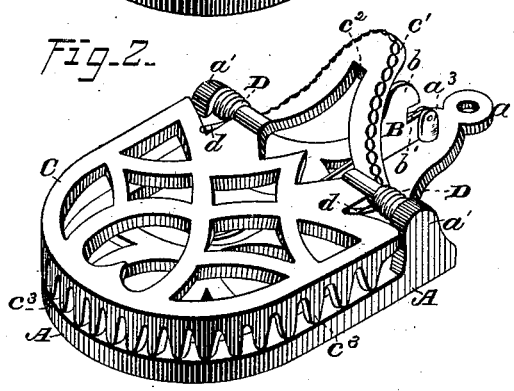
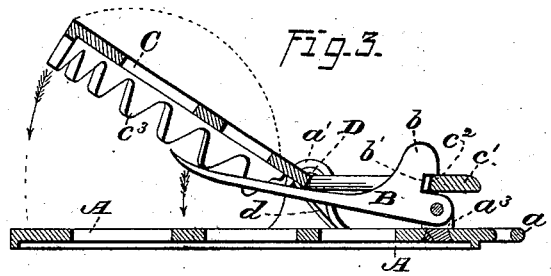
WITNESSES:
Jas. E. Hutchinson.
Henry C. Hazard.
INVENTOR.
Jas. M. Keep, by
Prindle and Co his Attys

UNITED STATES PATENT OFFICE.

JAMES M. KEEP, OF NEW YORK, N. Y., ASSIGNOR TO JOANNA N. KEEP, OF JERSEY CITY, N. J.

IMPROVEMENT IN ANIMAL-TRAPS.

Specification forming part of Letters Patent No. 221,320, dated November 4, 1879; application filed May 12, 1879.

*To all whom it may concern:*

Be it known that I, JAMES M. KEEP, of New York, in the county of New York, and in the State of New York, have invented certain new and useful Improvements in Mouse-Traps; and I do hereby declare that the following is a full, clear, and exact description thereof, reference being had to the accompanying drawings, making a part of this specification, in which—

Figure 1 is a perspective view of the parts of my trap separated from each other. Fig. 2 is a like view of said trap completed, but not set; and Fig. 3 is a vertical section of the same upon a line passing from front to rear near its center, said trap being set.

Letters of like name and kind refer to like parts in each of the figures.

The design of my invention is to simplify the construction, to lessen the expense, and to increase the efficiency of mouse and rat traps; to which end it consists, principally, in a trap having a jaw which is provided with a tail-piece that engages directly with the tripping bait-receiving pawl, substantially as and for the purpose hereinafter specified.

It consists, further, in a trap provided with a tripping-pawl which engages directly with the tail-piece of the pivoted jaw, and by a downward movement of its outer end releases said jaw, substantially as and for the purpose hereinafter shown.

It consists, further, in combining with the pivots and the bearings of the spring-jaw springs which perform the double office of closing said jaw and of holding said pivots within said bearings, substantially as and for the purpose hereinafter set forth.

It consists, further, in the construction of the bearings for the pivots of the spring-jaw, substantially as and for the purpose hereinafter shown and described.

It consists, finally, in the trap as a whole, its several parts being constructed and combined to operate in the manner and for the purpose substantially as hereinafter specified.

In the annexed drawings, A represents the base of my device, constructed of metal in the form shown in Fig. 1, its front end being formed upon a circular line, and its rear end provided with a tail-piece, $a$, that extends rearward. Said base is, preferably, made with an open-work central portion, for the purpose of lessening its weight.

At each rear corner of the base A is provided an ear, $a'$, which, for a mouse-trap, has a height of about one-half inch, and is provided with an inwardly-projecting flange, which extends along its rear edge and over its semicircular upper end, the front edge of said lug, below said curved end, being unprovided with a flange, the construction described forming at the inner side and upper end of said lug a semicircular recess or bearing, $a^2$, which is open at its lower side.

A slotted lug, $a^3$, near the rear end of the tail-piece $a$, affords a pivotal bearing for one end of a tripping-pawl, B, the construction and operation of which will be hereinafter described.

A second plate, C, having the general shape and dimensions of the base A, is provided at its rear corners with pivots $c$, which have their axes in a line and fit into the semicircular bearings $a^2$, where they are held by the action of two springs, D, one of which springs is coiled spirally around each pivot, with its inner end, $d$, extending forward upon the metal contiguous to the inner end of said pivot, while the outer end, $d$, of said spring extends downward and rearward, and is contained within a notch that is found within the rear edge of the base A at the inner side of the lug $a'$. The tension of said springs is such as to cause them to hold the pivots $c$ of said plate or jaw C upward within said bearings $a^2$, and to press the forward end of said jaw with a yielding pressure downward upon said base A.

The tail-piece $c'$ of the jaw C extends rearward and upward at an angle of about forty-five degrees, and is provided with an opening that extends to a point over the pivotal lug $a^3$, at which point is formed a right-angled shoulder, $c^2$.

The pawl B extends forward to or near the center of the base A, and its rear end is provided with a lug, $b$, which extends upward, and at its rear side has a notch, $b'$, that engages with the shoulder $c^2$ of the tail-piece $c'$ when the latter is turned downward to a horizontal position, and said pawl has its front end raised, as shown by the full lines of Fig. 3.

The engagement of the pawl B with the tail-piece $c'$ is so slight that the least touch upon the forward end of the former will release the latter and permit the jaw C to drop upon the base A, so that if cheese or other like article of food be attached to the front end of said pawl and the trap set, the effort of a mouse to eat from or to remove said food will spring said trap, and cause the head of the animal to be caught between said jaw and base.

To render more effective the operation of the jaw C, its lower face around its edge is provided with teeth $c^3$, which bear upon the base A whenever said jaw is closed downward.

If desired, the central portion of the jaw C may be extended upward in the form of a dome, as shown by dotted lines of Fig. 3.

In order that the base A may be cheaply constructed, an opening, $x$, is left beneath each bearing $a^2$, through which, in molding said base, the sand may extend upward into said bearings, the construction permitting the latter to be easily and quickly molded in an ordinary two-part flask.

In putting together the trap, the springs D are placed around the pivots $c$, and the latter then passed from the front into the bearings $a^2$, after which the pawl B is placed in position within its pivotal lug $a^3$.

Having thus fully set forth the nature and merits of my invention, what I claim as new is—

1. In a trap, the combination of a tripping bait-receiving pawl with a jaw that is provided with a tail-piece which engages directly with the same, substantially as and for the purpose specified.

2. In a trap, the combination of a pivoted jaw and a tripping-pawl which engages directly with the tail-piece of the same, and by a downward movement of its outer end releases said jaw, substantially as and for the purpose shown.

3. In combination with the pivots $c$ and bearings $a^2$ of the pivoted jaw C, springs D, which perform the double office of closing said jaw and of holding said parts within said bearings, substantially as and for the purpose set forth.

4. In a trap, a plate or base, A, provided with pivotal bearings $a^2$, which are open at their lower and front sides, and beneath each of which is an opening, $x$, substantially as and for the purpose shown and described.

5. A trap in which is combined the following-named elements, viz: a base, A, provided with bearings $a^2$ and pivotal lug $a^3$; a pawl, B, having an engaging-lug, $b$, and notch $b'$; a jaw, C, provided with pivots $c$, tail-piece $c'$, and shoulder $c^2$; and springs D, having each a central coil and radial ends, $d$ and $d'$, substantially as and for the purpose specified.

In testimony that I claim the foregoing I have hereunto set my hand this 4th day of April, 1879.

JAMES M. KEEP.

Witnesses:
GEO. S. PRINDLE,
HENRY C. HAZARD.